United States Patent [19]

Dunkley

[11] 4,212,736
[45] Jul. 15, 1980

[54] PRODUCTION OF METAL POWDER

[75] Inventor: John J. Dunkley, Bedford, England

[73] Assignee: Davy-Loewy Limited, Sheffield, England

[21] Appl. No.: 944,729

[22] Filed: Sep. 22, 1978

[30] Foreign Application Priority Data

Sep. 22, 1977 [GB] United Kingdom ............... 39557/77

[51] Int. Cl.² .............................................. B01D 37/00
[52] U.S. Cl. ................. 210/73 R; 75/0.5 C; 210/83; 210/265
[58] Field of Search ......... 264/11; 75/0.5 A, 0.5 AA, 75/0.5 AB, 0.5 AC, 0.5 B, 0.5 BA, 0.5 BB, 0.5 BC, 0.5 C, 0.5; 210/65, 66, 67, 173, 265, 284, 290, 416 R, 73 R, 73 S, 83

[56] References Cited

U.S. PATENT DOCUMENTS

| 15,733 | 9/1856 | Feix | 264/11 |
|---|---|---|---|
| 961,091 | 6/1910 | Angell | 210/265 |
| 1,433,357 | 10/1922 | Ellis | 210/265 |
| 1,831,094 | 11/1931 | Clayes | 210/265 |
| 1,838,263 | 12/1931 | Kelly | 210/265 |
| 2,051,126 | 8/1936 | Baxter et al. | 210/265 |
| 2,787,534 | 4/1957 | Golwynne | 75/0.5 B |
| 3,322,529 | 5/1967 | Pollock | 75/0.5 B |
| 3,450,525 | 6/1969 | Van Den Steen | 75/0.5 B |
| 3,695,795 | 10/1972 | Jossick | 75/0.5 C |
| 3,852,193 | 12/1974 | Jakubek et al. | 210/265 |
| 3,896,028 | 7/1975 | Phillips | 210/503 |
| 3,956,128 | 5/1976 | Turner | 210/290 |

Primary Examiner—Frank Sever
Attorney, Agent, or Firm—Schwartz & Weinrieb

[57] ABSTRACT

In the manufacture of metal powder by the water atomization of liquid metal, a batch of powder and water together constituting a slurry is pumped into a settling tank having a separate receptacle constituting the bottom of the tank. A filter bed is provided in the receptacle and the powder settles on to the filter bed. Excess water is drawn off from the receptacle which is then removed from the upper part of the tank and a cover is fitted. A differential pressure is then applied between the powder and the underside of the filter bed to suck out more of the water leaving the powder with a low water content on the filter bed.

3 Claims, 2 Drawing Figures

PRODUCTION OF METAL POWDER

FIELD OF THE INVENTION

This invention relates to the production of metal powder by water atomization of liquid metal.

BACKGROUND OF THE INVENTION

It is well known to atomize liquid metal by water jets impinging on a stream of the liquid metal in an atomizing vessel. This process results in the production of a mixture of water and metal powder consisting of say 10–30% by weight of metal powder. Although it is easy to separate the bulk of the water from the metal powder by a settling process, this produces a powder which contains 10–20% by weight water. Before the powder can be used this 10–20% of water has to be removed and it is known to put the wet powder into a centrifuge where the water content is reduced to say 3–4% by weight. Centrifuges are expensive machines both to purchase and also to operate.

OBJECTS OF THE INVENTION

It is an object of the present invention to reduce the water content of a slurry containing powder produced by water atomization without resorting to the use of a centrifuge.

SUMMARY OF THE INVENTION

According to a first aspect of the present invention, in a method of treating metal powder produced by water atomization of liquid metal in an atomizing vessel, a slurry of powder and water is delivered from the atomizing vessel to a settling tank where the powder is allowed to settle on to a filter bed adjacent the base of the tank, excess water above the surface of the powder is removed and a differential pressure is applied between the surface of the powder and the underside of the filter bed to expel water through the filter bed.

The water content of the slurry can be reduced by this method in a few minutes to say 4% by weight.

After the bulk of the water has been removed from the powder, hot air may be applied to the surface of the powder and forced through it and the filter bed in order to dry the powder.

According to a second aspect of the invention, a settling tank has a filter bed adjacent its base, means is provided above the level of the filter bed for permitting the outflow of liquid from the tank, and means for applying a differential pressure between the upper and lower sides of the filter bed is established within the tank so as to expel liquid through the filter bed from the upper to the lower side thereof.

In one embodiment of the invention, the base of the tank is constituted by a separate removable receptacle and the filter bed is mounted in the receptacle. In use, excess water above the receptacle is removed and the receptacle is then removed from the tank. A cover is applied to the receptacle and air under pressure is applied to the receptacle through an opening in the cover.

BRIEF DESCRIPTION OF THE DRAWINGS

In order that the invention may be more readily understood it will now be described, by way of example only, with reference to the accompanying drawings, in which.

DETAILED DESCRIPTION OF THE PREFERRED EMBODIMENTS

Figure 1:
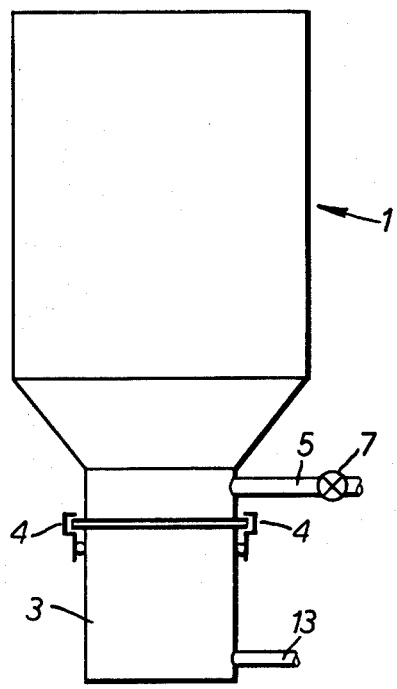
FIG. 1 is a side elevation of a settling tank in accordance with the present invention.
Figure 2:
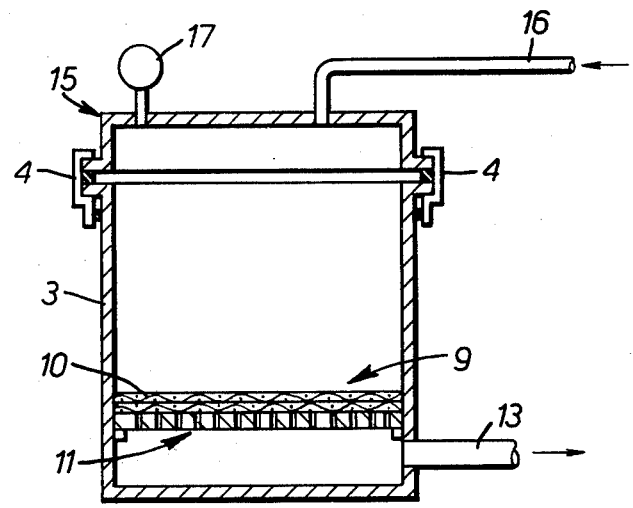
FIG. 2 is a diagrammatic sectional view of a receptacle forming part of the settling tank shown in FIG. 1.

In the manufacture of a batch of metal powder, a quantity of liquid metal is poured into an atomizing vessel and in this vessel jets of water impinge against the liquid metal to break it up into globules which solidify and form a powder. The powder and the water from the water jets is collected at the bottom of the atomizing vessel and it is pumped in the form of a slurry into a settling tank 1 which is in two parts. The lower part of the tank is constituted by a separate removable receptacle 3 which can readily be removed from, and secured in sealing relation to, the upper part of the tank 1 by means of clamps 4, bolts or like. Above the level of the joint between the upper open end of the receptacle and the lower end of the upper part of the tank there is an outflow pipe 5 with a valve 7. As shown in more detail in FIG. 2, the receptacle 3 has a filter bed 9 located adjacent its base. The filter bed conveniently comprises an apertured plate 11 supporting graded meshes 10 arranged with the finest mesh uppermost. Below the filter bed there is a drain line 13.

After the receptacle 3 has been removed from the upper part of the tank 1, a removable cover 15 can be clamped on to the top of the receptacle by the clamps 4 and this cover has an air inlet pipe 16 extending therethrough and also a pressure gauge 17.

In use, a slurry consisting of a batch of powder formed by water atomization in an atomizing vessel and water is pumped into the settling tank 1. The metal powder eventually settles into the receptacle 3 where it forms a thick wet cake on the filter bed 9. After the powder has settled on to the filter bed, the valve 7 is opened to allow much of the excess water to flow out of the settling tank through the pipe 5. Some of the water will have passed through the filter bed 9 but the thick layer or cake may still contain up to 15% of water.

The receptacle is now removed from the upper part of the settling tank and the cover 15 is fitted on to it. The drain line 13 is open to atmosphere and air above atmospheric pressure is applied through the pipe 16 to the upper surface of the powder in the receptacle. This differential pressure causes water to be expelled from the powder through the filter bed and after a period of between 5 and 10 minutes the pressure can be removed and the contents of the receptacle can be emptied into a dryer. By this process, the water content of the powder can be reduced to say 3–4%.

As an alternative, after the air pressure has been applied to the powder, further drying will result if the air which is applied is now heated so that the air passing through the powder and out of the filter bed serves to dry the powder. In this way it is possible to produce completely dry powder without using any special drying plant.

An advantage of employing a removable receptacle 3 to receive the thick layer of powder is that the receptacle and its powder contents can readily be removed from the upper part of the tank so that the powder which is in the form of a thick cake can be emptied out of the receptacle.

Obviously, many modifications and variations of the present invention are possible in light of the foregoing teachings. It is therefore to be understood that within the scope of the appended claims, the present invention may be practiced otherwise than as specifically described herein.

I claim:

1. In a method of treating metal powder produced by the water atomization of liquid metal in an atomizing vessel, the improvement comprising the steps of:

delivering a slurry of powder and water from the atomizing vessel to a settling tank, gravity settling the powder on to a filter bed adjacent the base of the tank, removing excess water above the surface of the powder, and applying a differential pressure between the surface of the powder and the underside of the filter bed so as to expel residual water through the filter bed.

2. A method as claimed in claim 1, in which said differential pressure comprises air at above atmospheric pressure applied above the surface of the powder and the underside of the filter bed is at atmospheric pressure.

3. A method as claimed in claim 2, in which the air supplied above the surface of the powder is above ambient temperature.

* * * * *